United States Patent [19]
Fan

[11] Patent Number: 5,493,416
[45] Date of Patent: Feb. 20, 1996

[54] METHOD COMBINING ERROR DIFFUSION AND TRADITIONAL HALFTONING WITH ARBITRARY SCREEN ORIENTATION

[75] Inventor: Zhigang Fan, Webster, N.Y.

[73] Assignee: Xerox Corporation, Stamford, Conn.

[21] Appl. No.: 332,011

[22] Filed: Oct. 31, 1994

[51] Int. Cl.[6] ........................ H04N 1/40
[52] U.S. Cl. ............... 358/447; 358/455; 358/456; 358/465; 382/252
[58] Field of Search ............... 358/447, 454, 358/455, 456, 458, 459, 465, 466; 382/252

[56] References Cited

U.S. PATENT DOCUMENTS

| | | | |
|---|---|---|---|
| 4,051,536 | 9/1977 | Roetling | 358/296 |
| 4,149,194 | 4/1979 | Holladay | 358/283 |
| 4,256,401 | 3/1981 | Fujimura et al. | 355/140 |
| 4,339,774 | 7/1982 | Temple | 358/283 |
| 4,625,222 | 11/1986 | Bassetti et al. | 346/160 |
| 4,633,327 | 12/1986 | Roetling | 358/283 |
| 4,654,721 | 3/1987 | Goertzel et al. | 358/283 |
| 4,672,463 | 6/1987 | Tomohisa et al. | 358/284 |
| 4,693,593 | 9/1987 | Gerger | 355/14 |
| 4,700,229 | 10/1987 | Herrmann et al. | 358/166 |
| 4,709,250 | 11/1987 | Takeuchi | 346/160 |
| 4,724,461 | 2/1988 | Rushing | 355/14 D |
| 4,924,322 | 5/1990 | Kurosawa et al. | 358/448 |
| 4,955,065 | 9/1990 | Ulichney | 382/50 |
| 5,045,952 | 9/1991 | Eschbach | 358/447 |
| 5,055,942 | 10/1991 | Levien | 358/456 |
| 5,226,096 | 7/1993 | Fan | 382/50 |
| 5,243,443 | 9/1993 | Eschbach | 358/455 |
| 5,321,525 | 6/1994 | Hains | 358/456 |
| 5,325,211 | 6/1994 | Eschbach | 358/466 |

OTHER PUBLICATIONS

Thomas. M. Holloday, "An Optimum Algorithm for Halftone Generation for Displays and Hard Copies", Proc. Society for Information Display, vol. 21, No. 2, 1980, pp. 185–192.

Floyd et al., *An Adaptive Algorithm for Spatial Greyscale*, Proceedings of the SID, 17/2, pp. 75–77 (1976).

Jarvis et al., *A Survey of Techniques for the Display of Continuous Tone Pictures on Bilevel Displays*, Computer Graphics and Image Processing, vol. 5, pp. 13–40 (1976).

Stucki, *Mecca—A Multiple-Error Correction Computation Algorithm for Bi-level Image Hardcopy Reproduction*, IBM Research RZ1060 (1981).

Goertzel et al., *Digital Halftoning on the IBM 4250 Printer*, IBM J Res Develop vol. 31, No. 1, pp. 2–15, Jan. 1987.

Holladay, *An Optimum Algorithm for Halftone Generation for Displays and Hard Copies*, Proceedings of the SID, vol. 21/2, 1980, pp. 185–192.

Roetling, *Halftone Method with Edge Enhancement and Moire Suppression*, J. Opt. Soc. Am., vol. 66, No. 10, Oct. 1976, pp. 985–989.

*Primary Examiner*—Edward L. Coles, Sr.
*Assistant Examiner*—Thomas L. Stoll
*Attorney, Agent, or Firm*—Oliff & Berridge

[57] ABSTRACT

A block-based error diffusion technique allows for the printing of colored images having arbitrary screen orientations. The technique improves reproducibility by only compensating for errors arising from quantization in selected "critical blocks".

21 Claims, 11 Drawing Sheets

* THRESHOLDS: (1/7)

| 1.5 | 2.5 | 3.5 | 4.5 | 5.5 | 6.5 | 0.5 | 1.5 | 2.5 | 3.5 | 4.5 | 5.5 | 6.5 | 0.5 |

⎧‾‾‾‾‾‾‾‾‾‾‾‾‾‾‾‾‾‾‾‾‾‾⎫ ⎧‾‾‾‾‾‾‾‾‾‾‾‾‾‾‾‾‾‾‾‾‾‾⎫
          1ST DOT                          2ND DOT

THRESHOLDING: RESULTS:

FIG.2(B)

| 1 | 1* | 0 | 0 | 0 | 0 | 1 | 1 | 1* | 0 | 0 | 0 | 0 | 1 |

| 1ST BLK | 2ND BLK | 3RD BLK | 4TH BLK |

* ALL THRESHOLDS ARE DIVIDED BY L

| BLOCK # | $B_{MAX}$ | $W_{MIN}$ | P | F |
|---------|-----------|-----------|---|---|
| 1 | 2.5/L | 3.5/L | | X |
| 2 | -0.5/L* | 4.5/L | | X |
| 3 | 2.5/L | 7.5/L** | | X |
| 4 | -0.5/L* | 3.5/L | | X |

P = PARTIAL DOT      F = FULL DOT

\* IF $B_{MAX}$ IS NON-EXISTENT ASSUME $B_{MAX}$ = -0.5/L

\*\* IF $W_{MIN}$ IS NON-EXISTENT ASSUME $W_{MIN}$ = 1+0.5/L

FIG.4

| BLOCK # | * CRITICAL LOCAL ERROR CALCULATION | ABS. VALUE | "CLE" |
|---|---|---|---|
| 1 | 2.5 − 2.5 − 0.5 = − 0.5 | 0.5 | −0.5 |
| 2 | 2.5 + 0.5 − 0.5 =   2.5 | 2.5 | 0 |
| 3 | 2.5 − 2.5 − 0.5 = − 0.5 | 0.5 | −0.5 |
| 4 | 2.5 + 0.5 − 0.5 =   2.5 | 2.5 | 0 |

ABS. VALUE = ABSOLUTE VALUE
"CLE" = CRITICAL LOCAL ERROR

IF / CRITICAL LOCAL ERROR / $\leq$ +0.5/L
THEN CRITICAL LOCAL ERROR = ACTUAL ERROR

IF / CRITICAL LOCAL ERROR / > +0.5/L
THEN CRITICAL LOCAL ERROR = 0

* ALL ERRORS ARE DIVIDED BY L

FIG.5

| BLOCK # | * CRITICAL BLOCK CALCULATIONS | Y/N |
|---|---|---|
| 1 | IS $1 \geq 2.5 - 2.5 \geq 0$ ?<br>IS $0.5 \geq 3.5 - 2.5 \geq 0$ ? | Y<br>N |
| 2 | IS $1 \geq 2.5 - (-0.5) \geq 0$ ?<br>IS $0.5 \geq 4.5 - 2.5 \geq 0$ ? | N<br>N |
| 3 | IS $1 \geq 2.5 - 2.5 \geq 0$ ?<br>IS $0.5 \geq 7.5 - 2.5 \geq 0$ ? | Y<br>N |
| 4 | IS $1 \geq 2.5 - (-0.5) \geq 0$ ?<br>IS $0.5 \geq 3.5 - 2.5 \geq 0$ ? | N<br>N |

Y=YES    N=NO

* ALL ERRORS DIVIDED BY L

FIG.6

| STEP ↓ / BLOCK # → | 1 | 2 | 3 | 4 |
|---|---|---|---|---|
| CRITICAL LOCAL ERROR | -0.5/L | 0 | -0.5/L | 0 |
| MULTIPLY BY NB MAX | -0.5/L | 0 | -0.5/L | 0 |
| PROPAGATED ERROR | 0 | -0.5/L | -0.5/L | 0 |
| TOTAL ERROR BEFORE COMPENSATION | -0.5/L | -0.5/L | -1.0/L | 0 |
| CRITICAL BLOCK ? | YES | NO | YES | NO |
| COMPENSATE ? | NO | NO | YES | NO |

FIG.7

FIG. 8(B) SCREEN BASED ON INVENTIVE METHOD

FIG. 8(A) TRADITIONAL SCREENING

METHOD COMBINING ERROR DIFFUSION AND TRADITIONAL HALFTONING WITH ARBITRARY SCREEN ORIENTATION

BACKGROUND OF THE INVENTION

1. Field of the Invention

This invention relates to an error diffusion scheme combined with traditional halftoning which can be used for printing black and white as well as color images.

2. Discussion of Related Art

Several techniques have been proposed for combining traditional halftoning, and error diffusion over the last few years, such as is disclosed in U.S. Pat. No. 5,226,096 to Fan, U.S. Pat. No. 5,243,443 to Eschbach and U.S. Pat. No. 5,321,525 to Hains. The rationale behind such combinations is to reduce coarse quantization artifacts without sacrificing resolution. Coarse quantization artifacts are visible in image areas where a scene has little variation. This is also known as "banding." Banding is due to a limited number of output gray levels being available. The banding artifacts generally increase with decreasing cell size, which is identical to a decrease in the number of levels that can be represented by a halftone cell. The techniques mentioned above by Fan and Hains partition an image into disjoint areas which are usually rectangular blocks. Thereafter, the image is then processed block-by-block. This processing typically includes, as a first step, ordered dithering or halftoning after which block-based error diffusion techniques are used to reduce quantization errors. A major constraint of block-based error diffusion techniques is that the blocks are required to cover a halftone cell. It is well known that digital halftone threshold matrices can be represented by periodically repeated rectangular blocks using Holladay's method; Thomas M. Holladay, An Optimum Algorithm for Halftone Generation for Displays and Hard Copies', Proc. Society for Information Display, Vol. 21, No. 2, 1980, pp. 185–192. Consequently for applications which involve printing black and white images the constraint mentioned above does not cause much of a problem since such printing involves the use of 45° screens, which have a Holladay block, width-to-height ratio of 2. However, the same is not true for printing color images which typically involve the use of arbitrary screen orientations, e.g., 15° or 75° screens. Typically, such screens have blocks which have very large or very small width-to-height ratios which makes it difficult to use block-based error diffusion.

SUMMARY OF THE INVENTION

In accordance with the invention there is provided a method in which the size and the width-to-height ratio of a block is largely independent of the dot size and halftone angle. This technique can therefore be applied to improve the reproducibility of color images which typically involve the use of screens having arbitrary orientations.

In accordance with another aspect of the invention errors, arising from quantization, are compensated for only within "critical blocks".

In accordance with another aspect of the invention errors, arising from quantization, are compensated for only on full dots. A full dot is defined to be a dot which is possibly generated by a uniform area. A dot in turn is made up of a plurality of pixels. In addition, error diffusion is performed only in areas where the gray level of an original continuous-tone image has little variation. The rationale for this is two-fold, namely: (1) in an area of fine detail the human eye is not sensitive to precise gray levels and any related quantization errors; and (2) this technique avoids possible artifacts introduced by changing pixel values related to partial dots.

BRIEF DESCRIPTION OF THE DRAWINGS

These and other aspects of the invention will become apparent from the following descriptions which illustrate a preferred embodiment of the invention when read in conjunction with the accompanying drawings in which.

DESCRIPTION OF PREFERRED EMBODIMENTS

Figure 1A:
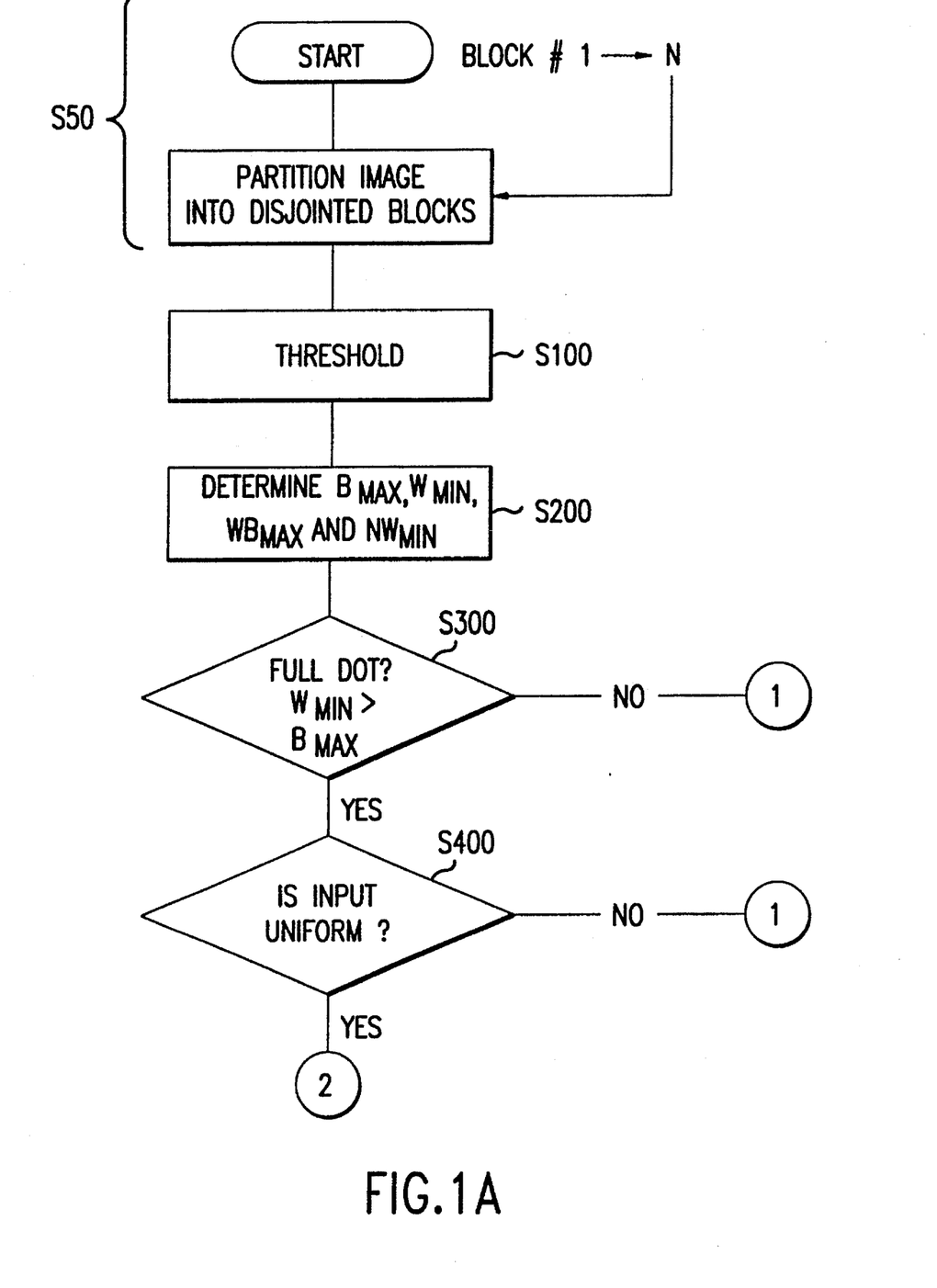
FIGS. 1(A)–(D) are flow charts of an embodiment of the invention.
Figure 1B:
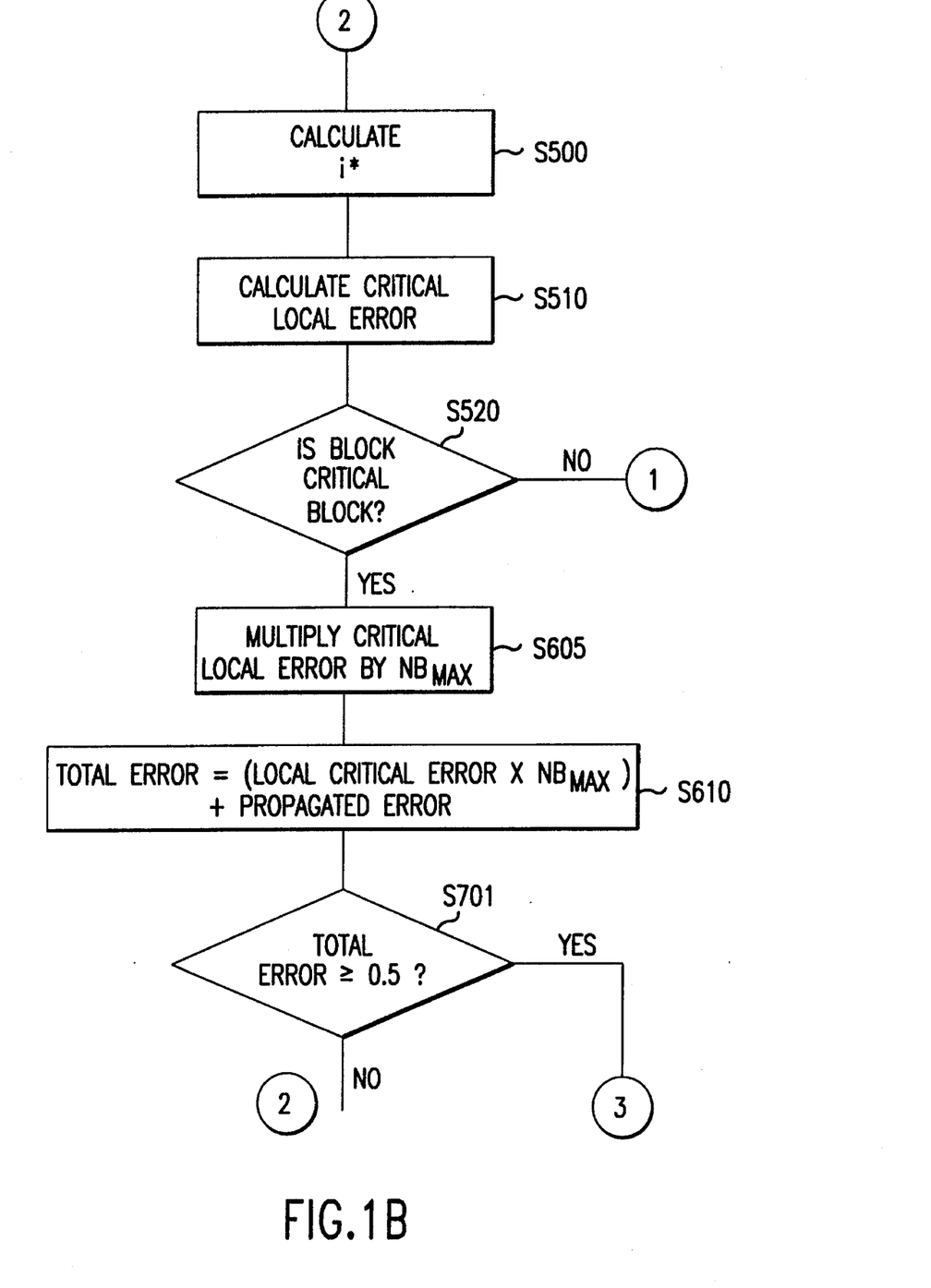
Figure 1C:
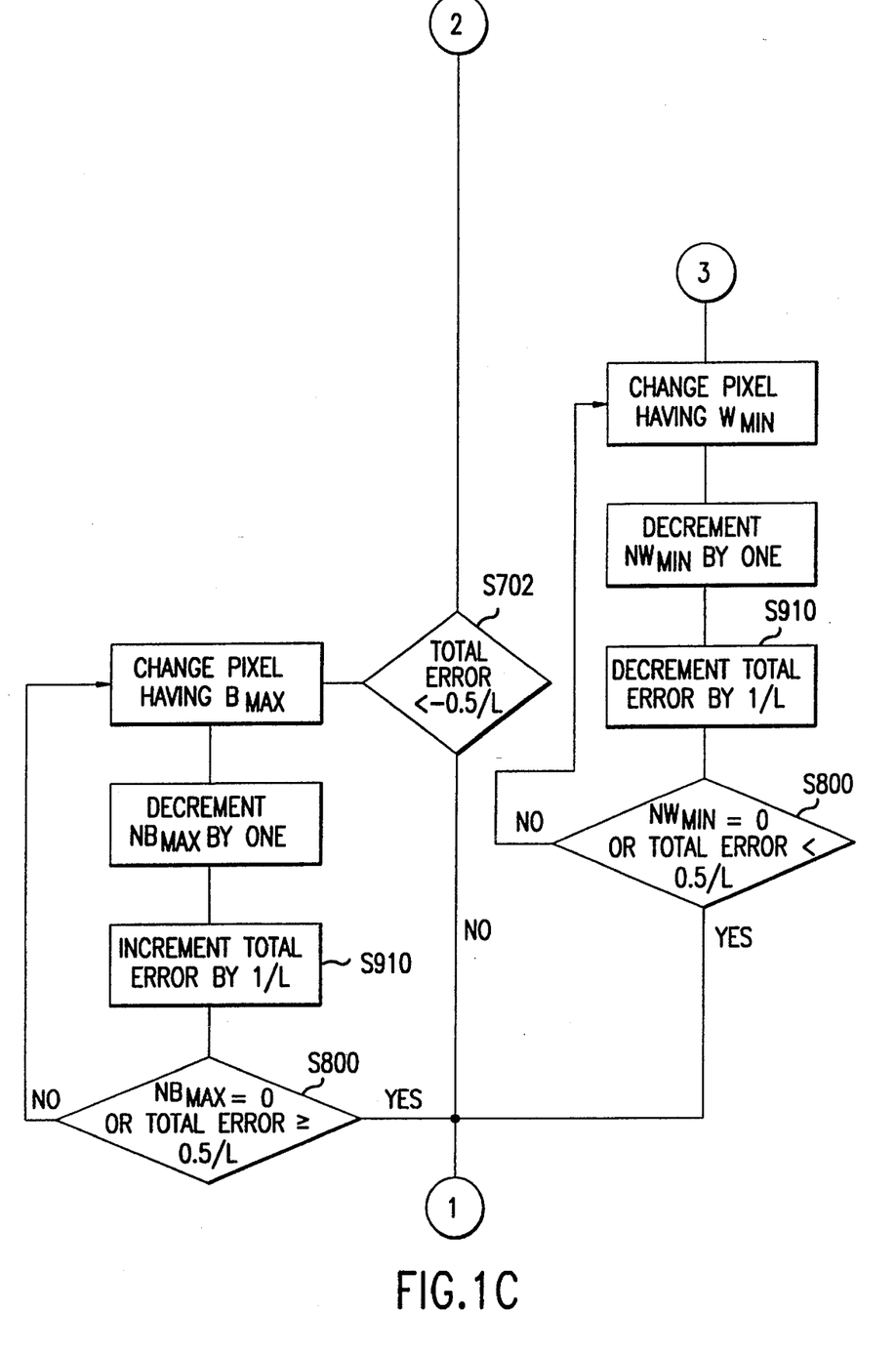
Figure 1D:
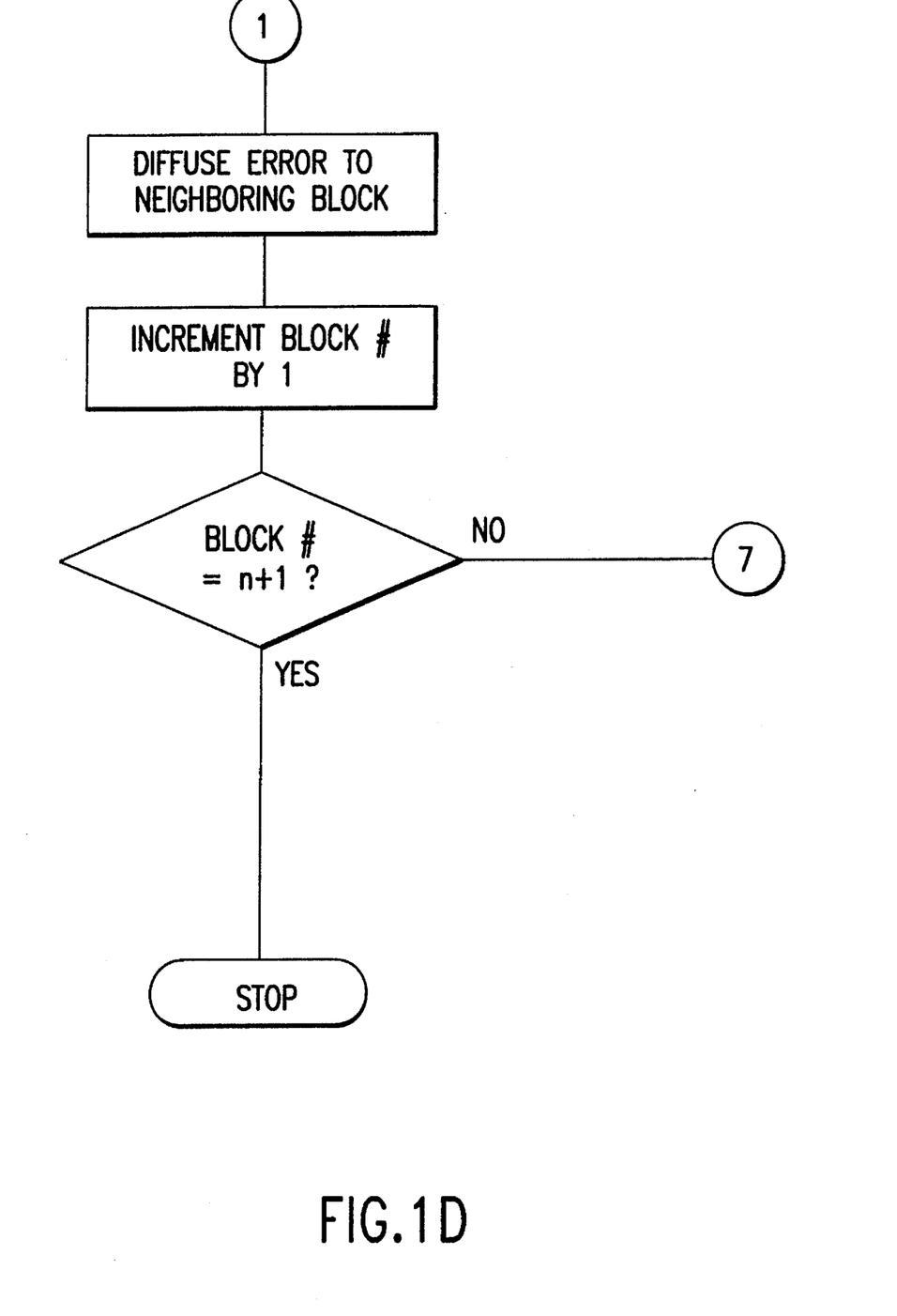
Figure 2A:
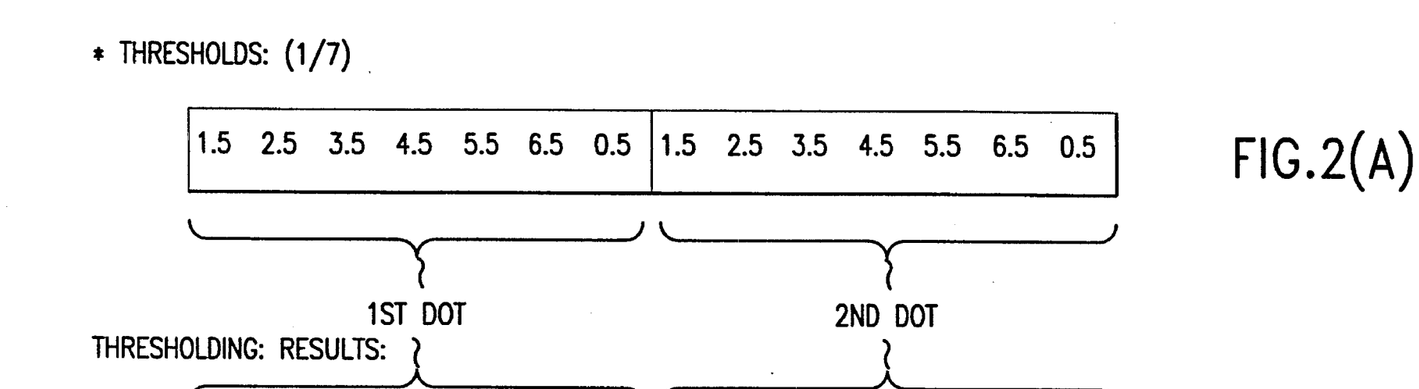
FIGS. 2(A) and (B) depict two dots before and after a prior art thresholding process.
Figure 2B:
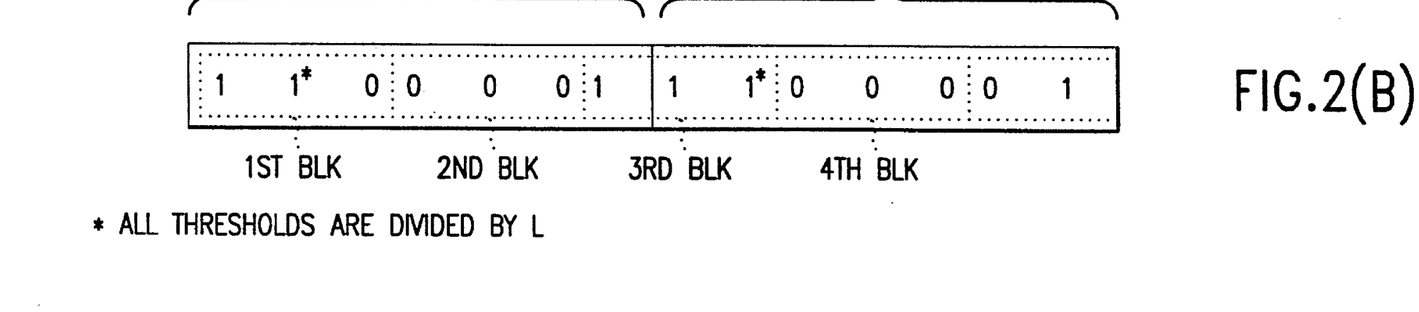

Referring now to the drawings where the showings are for the purpose of describing an embodiment of the invention and not for limiting the same, FIGS. 1(A)–(D) show flow charts describing the steps of one embodiment of the present inventive process. We assume here that the input graytone is within the range of [0,1] and the output value is either 0 or 1. As a preliminary step the image, which is stored using a memory as is well known in the art, is partitioned into disjointed blocks at step S50. At step S100 each pixel is thresholded against an appropriate threshold level established by the halftone cell used. As represented in FIG. 2(A) two 1×7 dots having seven different pixel reference levels are shown. Pixel 1 in dot 1 has a threshold of 1.5/L while pixel 5 in dot 1 has a threshold of 5.5/L, where L is the size of the cells, which is 7 in this example. Each group of seven pixels also corresponds to a dot "period". The results of the thresholding or ordered dithering are shown in FIG. 2(B) where each group of three pixels corresponds to blocks 1, 2, 3 and 4, respectively. As shown a block, e.g., block 3, may overlap more than one period or dot. Since a constant input of 2.5/L will, by way of example only, be used, the "average" output value must also equal 2.5/L. That is, the average of all periods should be 2.5/L. Any threshold at 2.5/L or below is given a binary 1 while any threshold above 2.5/L is given a binary 0.

Figure 3A:
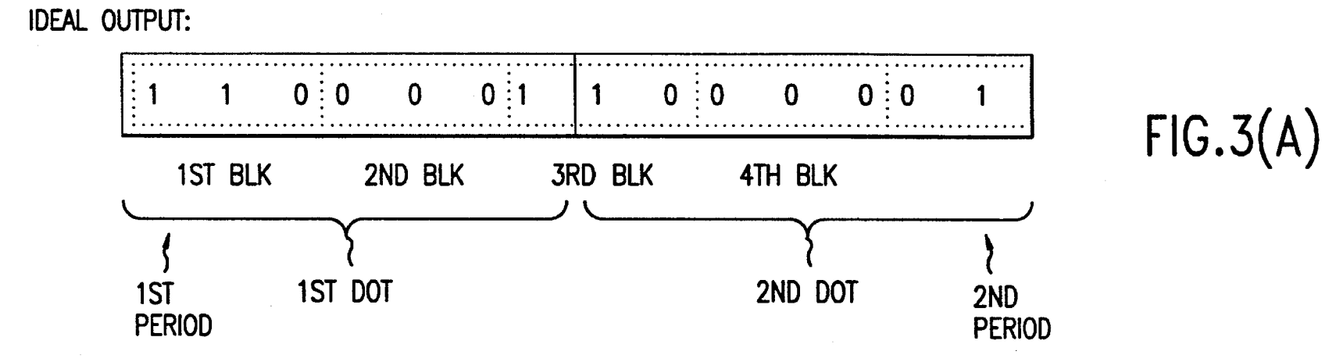
FIGS. 3(A) and 3(B) depict ideal thresholding results and results of a prior art thresholding technique, respectively.

FIG. 3(A) displays ideal output values for each of the two dot periods shown in FIG. 2(A). The first period having a value of 3/L, i.e., a total of 3 pixels are in the "ON" state represented by a binary 1 while the second dot or period has a value of 2/L, i.e., the first and seventh pixel are in the "ON" state represented by a binary number 1. It can be seen then that the average value of the two periods is 2.5/L; (3+2)/L= 5/L;(5/L÷2) periods=2.5/L.

Figure 3B:
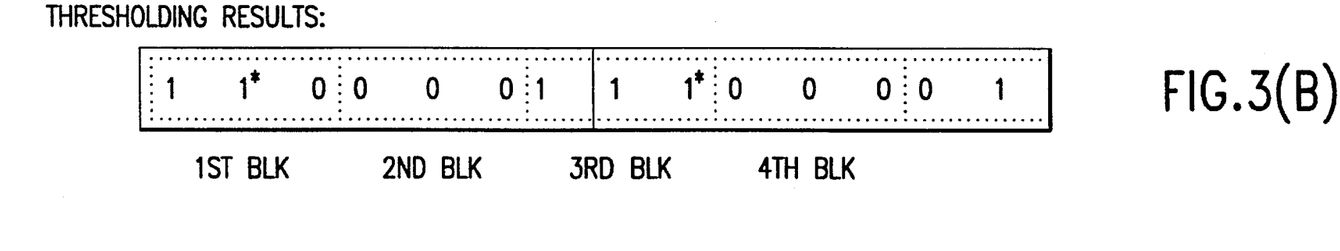

Comparing the actual values shown in FIG. 2(B) which are carried over to FIG. 3(B) to the ideal values shown in FIG. 3(A) it can be seen that the average of the two periods resulting from thresholding is 3/L and not 2.5/L. That is, the first period shown in FIG. 3(B) has a value of 3/L, i.e., pixels 1, 2 and 7 are in an "ON" state. The second period shown in FIG. 3(B) also has a value of 3L. Since the average result of thresholding is equal to 3/L, an error in the original gray level arises. To correct for this error, one of the two periods shown in FIG. 3(B) must have its value changed from 3/L to a 2/L to make the overall average of the two periods equal to 2.5/L. Further, to accomplish this, one pixel in either of the two periods must change from a binary 1 to a binary 0. It should be noted that the thresholding results shown in FIG. 3(B) represent the extent of prior art thresholding techniques. Referring back to FIG. 1 the next step S200 involves recording a first or maximum threshold, $B_{max}$, that produces an "ON" pixel or first representative level in a given block, a second or minimum threshold, $W_{min}$, that generates an "OFF" pixel or second representative level, i.e. binary 0, in a given block, a first number of pixels, $NB_{max}$, in a block with thresholds $B_{max}$ and a second number of pixels, $NW_{min}$, in a block with thresholds $W_{min}$, respectively. In the first block of the examples given in FIGS. 2(A) and (B) the maximum threshold which results in a binary 1 is 2.5/L, therefore, $B_{max}$=2.5/L; while the minimum threshold which results in a binary 0 is 3.5/L, therefore, $W_{min}$= 3.5/L.

$B_{max}$ and $W_{min}$ are then compared to decide if the output pattern obtained by thresholding is a full dot pattern (or a part of a full dot pattern) or a partial dot. A partial dot is the result of a halftoning process over an area at an edge in an image, where an edge might be defined as an abrupt change in the gray level of the image. A partial dot reflects that abruptness such that a portion of a dot is at one gray level, while another portion of the dot is at a second gray level. One particularly notable characteristic is that, for a given dither matrix or halftone cell, the thresholding operation is inconsistent across the cell area, e.g., at one pixel in the cell, a high level threshold is exceeded while at another pixel in the cell a low level threshold is not exceeded. Thus, the partial dot may be detected as a pattern which is not equal to one of a set of predetermined patterns that reflect a fairly uniform gray level. Accordingly, since there is no uniform gray level over a partial dot, the dot may be treated as two gray levels.

A full dot pattern results in: $W_{min}>B_{max}$; while a partial dot is indicated by the opposite, namely, $W_{min} \leq B_{max}$. If the dot is a partial dot as determined at step S300, then the total error of a particular block is propagated to its neighboring blocks without any compensation. If, however, the dot is a full dot at S300 the process proceeds to the next step S400.

Figure 4:
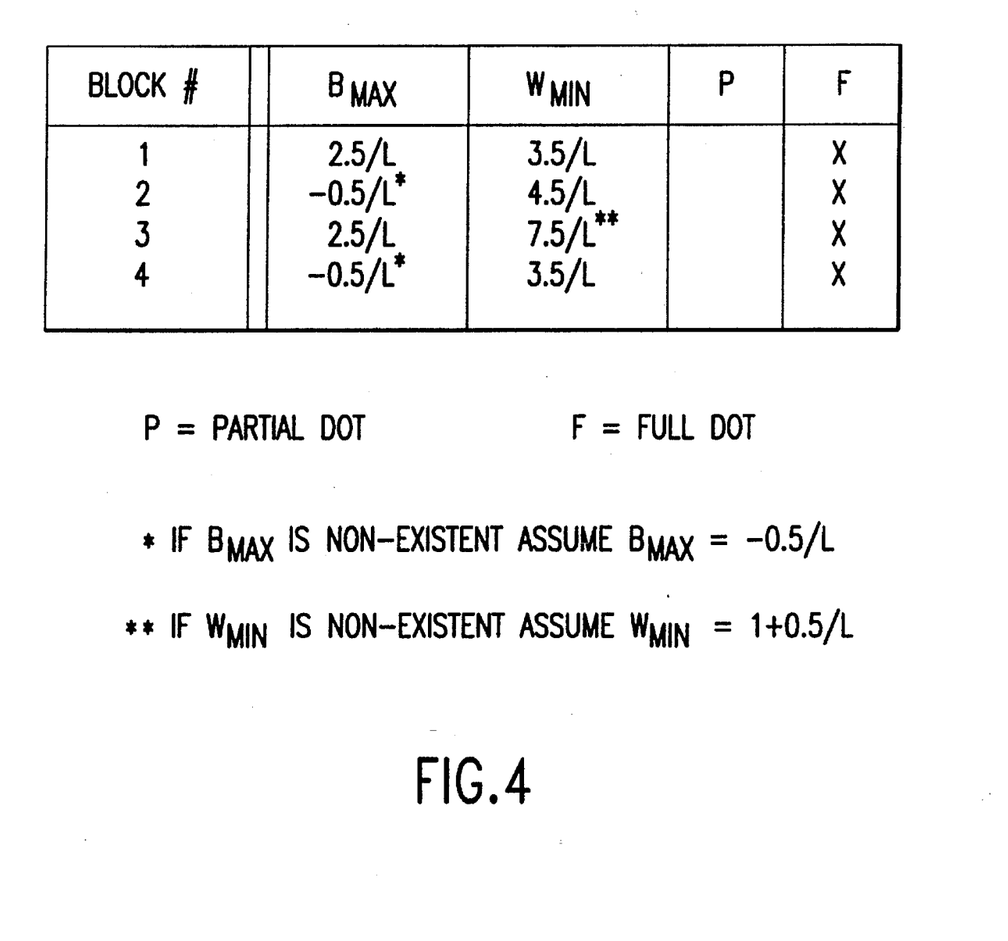
FIG. 4 is a table listing maximum and minimum values of four illustrative blocks used in separating full dots from partial dots.

As shown in FIG. 4 each dot shown in FIG. 2(A) is determined to be full dot. It should be noted that both blocks 2 and 4 have no pixels "ON", i.e., no pixel is indicated by a binary 1. In such an instance, when $B_{max}$ is nonexistent, $B_{max}$ is set to equal −0.5/L. Likewise, block 3 which contains no pixels which are "OFF", i.e., no pixel is equal to a binary 0, such that the lowest $W_{min}$ is nonexistent, then $W_{min}$ is set to 1+0.5/L. Returning to FIG. 2(A), we can determine $NB_{max}$ and $NW_{min}$. Looking at each block, $B_{max}$ (or the value 2.5/L) occurs once in block 1. Thus, $NB_{max}$ is set equal to 1. Similarly, $NW_{min}$ ($W_{min}$=3.5/L) occurs once in block 1. Thus, $NW_{min}$ is also set to equal 1 for block 1. Similarly, each block has an associated $NB_{max}$ and $NW_{min}$.

At step S400, the levels of data input to each block are measured to determine if they are homogeneous or uniform. Homogenity is determined by comparing the dynamic range of data input to a block to an appropriate threshold. If the block is not homogeneous then the total error of the block is propagated without compensation to its neighboring blocks. Since we have chosen for our example a constant input of 2.5/L, our input is assumed to be uniform so the process continues to step S500. At step S500 an average gray area of each block, i*, is calculated from the formula:

$$i^* = \Sigma_{k \epsilon block} y(k)/block\ size.$$

Since we have chosen a constant input value of 2.5/L, the average gray value of each block should also be a constant 2.5/L.

The critical local error at step S510 is then calculated for each block using the equation:

$$Critical\ Local\ Error = |[i-(B_{max}+0.5/L)]|$$

Figure 5:
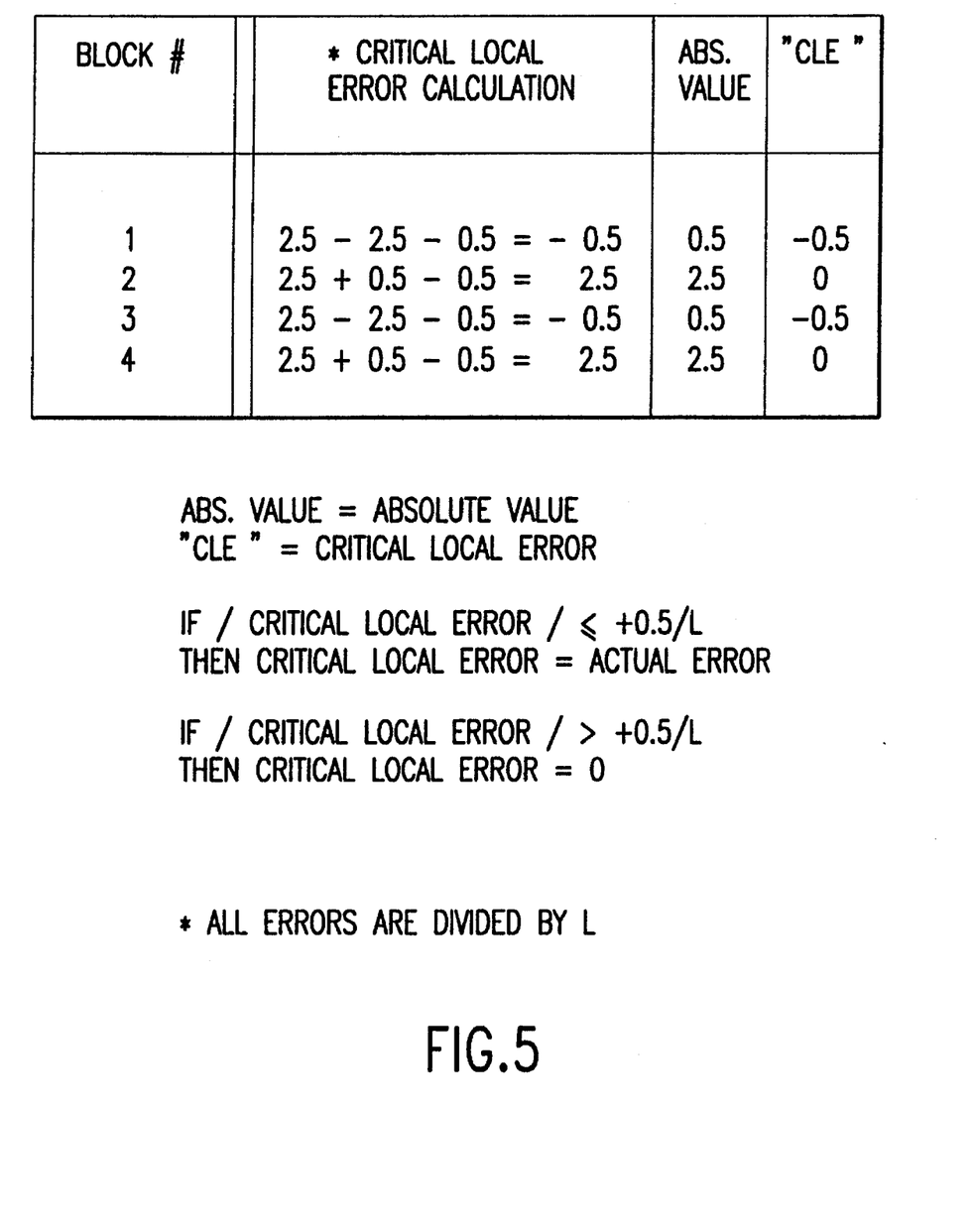
FIG. 5 is a table listing critical local errors for four illustrative image blocks.

The critical local errors for blocks 1–4 are given in FIG. 5. Referring to FIG. 5, if the absolute value of a calculated critical local error for a given block is less than or equal to 0.5/L then the critical local error is equal to the actual error (e.g., the critical local error of block 1 is −0.5/L, the absolute value of −0.5/L equals +0.5/L so the critical error remains −0.5/L). If, however, the absolute value of the critical local error is greater than 0.5/L, then the critical local error is set to equal 0 (e.g., the critical local error of block 2 is 2.5/L, the absolute value of 2.5/L is +2.5/L; the critical local error is therefore set to 0). At step S520 each block is analyzed to determine if it is a critical block or not. A block is called a "critical block" if one of two situations are met, namely:

$$1/L \leq i^* - B_{max} \leq 0$$

or $$0.5/L \leq W_{min} - i^* \leq 0$$

Figure 6:
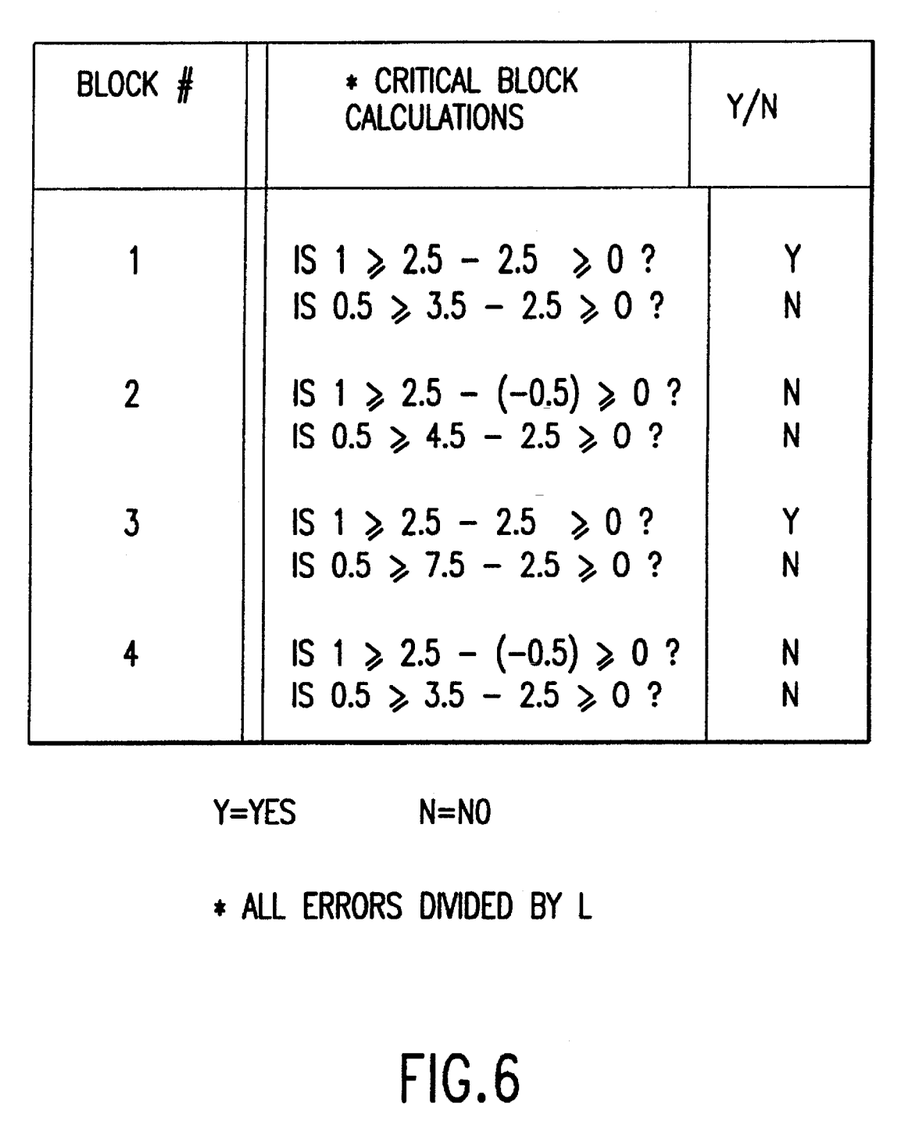
FIG. 6 is a table which identifies critical blocks using the critical local errors of FIG. 5.

As shown in FIG. 6, blocks 1 and 3 are critical blocks. Thus, errors arising from quantization will be compensated for within these critical blocks. If a block is not determined to be a critical block such errors will not be compensated for within the block.

At step S610, the total error is arrived at by first multiplying the critical local error by a factor of $NB_{max}$ (step 605) and adding diffused or propagated errors from neighboring blocks. If:

(1)(a) Total error≤0.5/L or (b) Total error>−0.5/L then pixels from the critical block are changed (steps 701 and 702). In order to determine which pixel within the block should be changed, it is necessary to follow the following additional formulas:

(2) If the total error is >0, change the binary value of the pixel in a corresponding block having a threshold $W_{min}$ (S800)

or (3) If the total error is <0, change the binary value of the pixel of the particular block having a threshold $B_{max}$ (S800).

Equations (2) and (3) assume that only one pixel per block will have a value of $B_{max}$ or $W_{min}$. If more than one pixel per block has a value of $W_{min}$ in equation (2) then the pixel that has an input closest to $W_{min}$ is selected and changed. Similarly if more than one pixel has a value $B_{max}$ in equation (3) then the pixel whose input is closest to $B_{max}$ is selected and changed.

After selecting the block where a pixel is to be changed, the total error is reduced or increased by a value of 1/L at step S910 depending upon the sign of the original total error, i.e. positive or negative.

If the original total error is positive or greater than zero, then the total error is reduced by 1/L until the total error is less than 0.5/L or until the number of pixels changed in the selected block equals $NW_{min}$. In this manner errors resulting from quantization are compensated for in critical blocks.

On the other hand, if the original total error is negative, then the total error is increased by 1/L until the total error is greater than or equal to −0.5/L at step S910 or until the number of pixels changed in the selected block equals $NB_{max}$.

Figure 7:
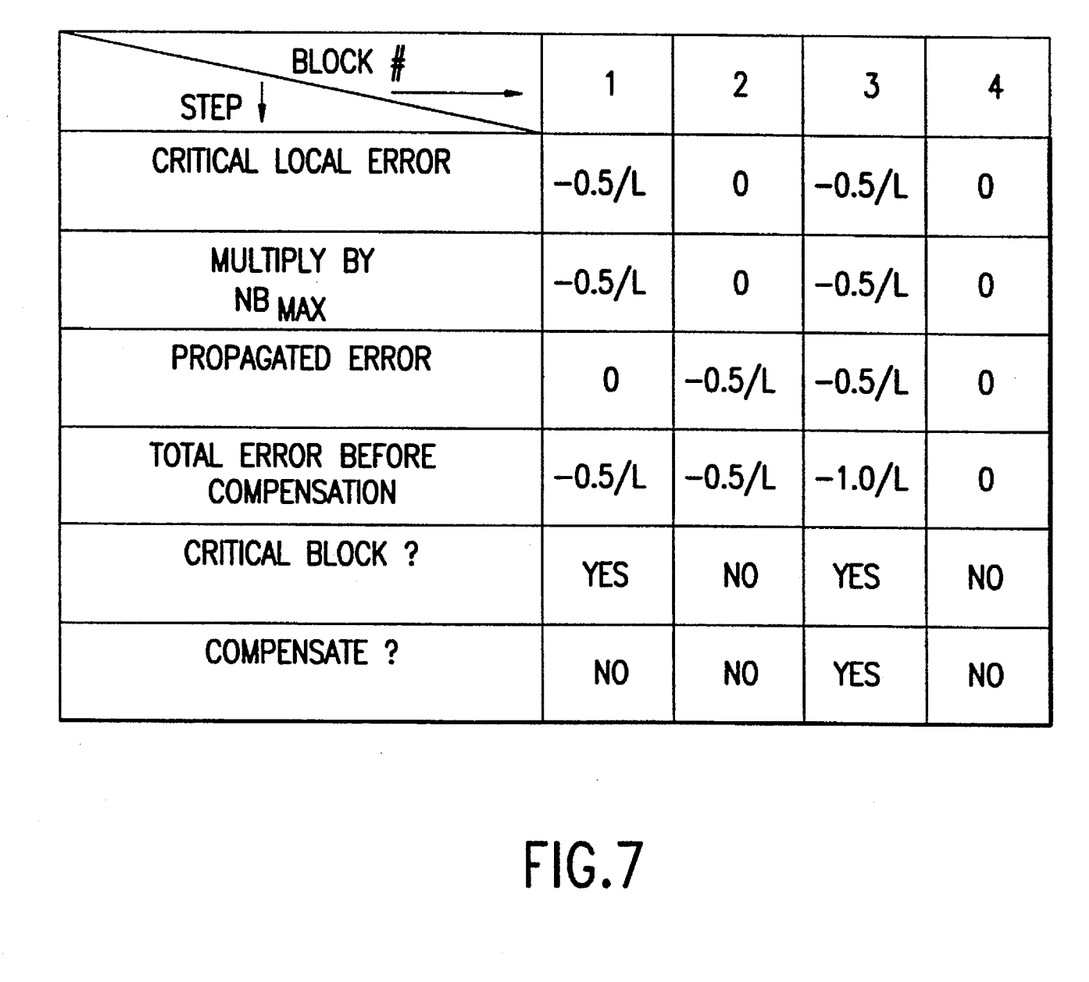
FIG. 7 is table showing error diffusion of four illustrative blocks.

FIG. 7 lists the results of one example of steps 600–910 using the same four illustrative blocks referred to in FIGS. 2–6.

For example, block 1's critical local error of −0.5/L is first multiplied by 1, i.e. $NB_{max}=1$, and then is added to a propagated remainder of 0 (assuming block 1 has no preceding, neighboring blocks) to arrive at a total error of −0.5/L. Since block 1 is a critical block (see FIGS. 5 and 6) error compensation may be carried out. For critical blocks we first apply formulas (1)(a) and (b).

Since the total error is −0.5/L, equations (1)(a) or (b) are not met; error compensation does not occur. Block 1's total error is propagated to block 2.

It should be noted that although we need only discuss diffusion in one dimension to illustrate the inventive concepts of this invention, diffusion may occur in more than one dimension involving several neighboring blocks. Block 2's total error is −0.5/L. Since block 2 is not a critical block we do not apply equations (1)(a) or (b). Instead block 2's total error is diffused to block 3. Block 3, a critical block (see FIGS. 5 and 6), has a total error of −1.0/L. Since equation (1)(b) is satisfied we next apply equations (2) and (3). Since block 3's total error of −1.0/L is less than 0, equation (3) applies.

Equation (3) requires us to change the pixel which corresponds to $B_{max}$, i.e. 2.5/L; changing pixel 3 of block 3 from a binary 1 to a binary 0. This changes the average value of period number two to 2/L (pixel 1 and 7 of period two have binary values of 1) making the overall average period value (period 1 and period 2) 2.5/L.

At this point the total error is increased by 1/L. The total error is then checked to see if it is still greater than or equal to 0.5/L. If so, the process is repeated until the total error is less than 0.5/L or the number of pixels changed in the block reaches $NW_{min}$. Since the total error equals 0 when it is increased by 1/L, the process stops. The total error is then propagated to block 4.

Figure 8A:
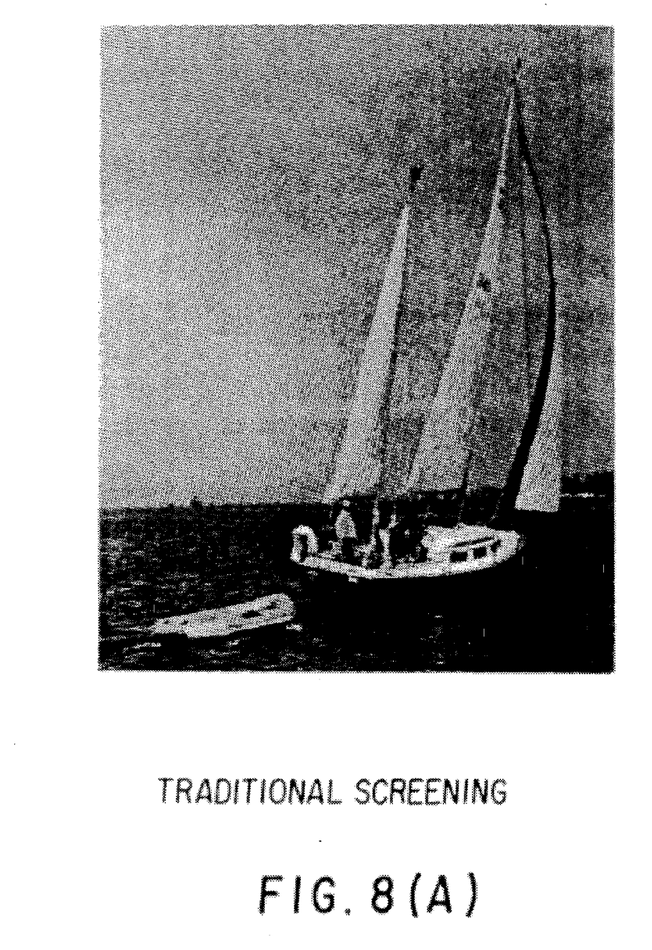
FIGS. 8(A) and 8(B) show examples of a traditional screen and a screen according to an embodiment of the present invention, respectively.
Figure 8B:
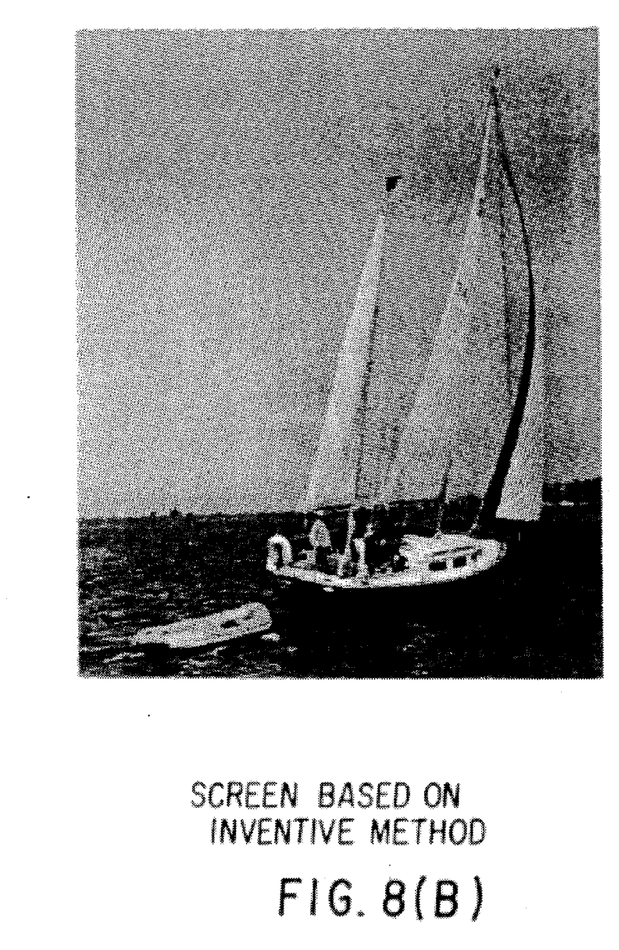

FIG. 8(A) shows an image using a traditional screening method while FIG. 8(B) shows an image using a screen resulting from the inventive method. FIG. 8(A) uses a screen which has a dot size of 1×26 and a shift parameter of 5. Coarse quantization effects are visible in FIG. 8(A).

In FIG. 8(B), coarse quantization effects are significantly reduced. The block size of FIG. 8(B) is 2×4.

It will no doubt be appreciated that the described method has alternative descriptions. The invention has been described with reference to a particular embodiment. Modifications and alterations will occur to others upon reading and understanding this specification. It is intended that all such modifications and alterations are included insofar as they come within the scope of the appended claims or equivalents thereof.

What is claimed is:

1. A method of reducing coarse quantization artifacts in an image comprising the steps of:
    partitioning the image stored in memory into disjointed blocks, each block comprising a plurality of pixels, each pixel having a threshold level;
    thresholding the levels to at least two representative levels;
    determining a first threshold level for each block representative of a maximum threshold level that produces one of said representative levels and a second threshold level for each block representative of a minimum threshold level that produces a second one of said two representative levels;
    further determining a first number of pixels in each of said blocks having said first threshold level and a second number of pixels having said second threshold level;
    comparing said first threshold level of said block to said second threshold level of said block;
    measuring levels of data input to each of the blocks provided said compared second threshold level is greater than said compared first threshold level;
    calculating an average value and a critical local error of each of the blocks provided said measured input levels are homogeneous;
    determining which of the blocks are critical blocks using said calculated critical local errors;
    multiplying said local critical errors by said first number of pixels;
    adding results of said multiplication to propagated errors to determine a total error for each block;
    determining whether a total error is <−0.5/L or ≦0.5/L for each critical block;
    first changing pixels in one of said critical blocks having said second threshold level provided said total error of said critical block is greater than 0;
    reducing said total error of said critical block by 1/L until said total error is less than 0.5/L where L is the size of a halftone cell;
    second changing pixels in one of said critical blocks having said first threshold level provided said total error of said critical block is less than 0;
    increasing said total error of said critical block having said changed second pixels by 1/L until said total error is greater than or equal to −0.5/L; and
    diffusing each of said reduced or increased total errors of each of said critical blocks or total errors of unchanged critical blocks and non-critical blocks to at least one neighboring block.

2. The method according to claim 1, wherein the step of determining a first threshold level comprises the step of setting said first threshold level to −0.5/L if said determined first threshold level is determined to be 0.

3. The method according to claim 1, wherein the step of determining a second threshold level comprises the step of setting said second threshold level to 1+0.5/L if said determined second threshold level is determined to be 0.

4. The method according to claim 1, wherein the step of reducing comprises reducing said total error until a total of said first changed pixels is equal to said second number of pixels having said second threshold level.

5. The method according to claim 1, wherein the step of increasing comprises increasing said total error until a total of said second changed pixels is equal to said first number of pixels having said first threshold level.

6. The method according to claim 1, wherein the step of first changing pixels comprises changing a pixel having said second threshold level and an input closest to said second threshold level when said first number of pixels having said second threshold level is greater than 1.

7. The method according to claim 1, wherein the step of second changing pixels comprises changing a pixel having said first threshold level and an input closest to said first threshold level when said second number of pixels having said first threshold level is greater than 1.

8. A method of reducing coarse quantization artifacts in an image comprising the steps of:

partitioning the image stored in memory into disjointed blocks, each block comprising a plurality of pixels, each pixel having a threshold level;

thresholding the levels to at least two representative levels;

determining a first threshold level for each block representative of a maximum threshold level that produces one of said representative levels and a second threshold level for each block representative of a minimum threshold level that produces a second one of said two representative levels;

further determining a first number of pixels in each of said blocks having said first threshold level and a second number of pixels having said second threshold level;

comparing said first threshold level of said block to said second threshold level of said block;

measuring levels of data input to each of the blocks provided said compared second threshold level is greater than said compared first threshold level;

calculating an average value and a critical local error of each of the blocks provided said measured input levels are homogeneous;

determining which of the blocks are critical blocks using said calculated critical local errors;

multiplying said local critical errors by said first number of pixels;

adding results of said multiplication to propagated errors to determine a total error for each block;

determining whether a total error is $<-0.5/L$ or $\leq 0.5/L$ for each critical block where L is the size of a halftone cell; and reducing quantization artifacts in a critical block having a total error $\leq 0.5/L$ or $<-0.5/L$ using said critical local error of said critical block.

9. The method of reducing coarse quantization artifacts according to claim 8, wherein said step of reducing quantization artifacts further comprises the steps of:

first changing pixels in one of said critical blocks having said second threshold level provided said total error of said critical block is greater than 0;

reducing said total error of said critical block by $1/L$ until said total error is less than $0.5/L$;

second changing pixels in one of said critical blocks having said first threshold level provided said total error of said critical block is less than 0;

increasing said total error of said critical block having said changed second pixels by $1/L$ until said total error is greater than or equal to $-0.5/L$; and diffusing each of said reduced or increased total errors of each of said critical blocks or total errors of unchanged critical blocks and non-critical blocks to at least one neighboring block.

10. The method according to claim 8, wherein the step of determining a first threshold level comprises the step of setting said first threshold level to $-0.5/L$ if said determined first threshold level is determined to be 0.

11. The method according to claim 8, wherein the step of determining a second threshold level comprises the step of setting said second threshold level to $1+0.5/L$ if said determined second threshold level is determined to be 0.

12. The method according to claim 9, wherein the step of reducing said total error comprises reducing said total error until a total of said first changed pixels is equal to said second number of pixels having said second threshold level.

13. The method according to claim 9, wherein the step of increasing comprises increasing said total error until a total of said second changed pixels is equal to said first number of pixels having said first threshold level.

14. The method according to claim 9, wherein the step of first changing pixels comprises changing a pixel having said second threshold level and an input closest to said second threshold level when said first number of pixels having said second threshold level is greater than 1.

15. The method according to claim 9, wherein the step of second changing pixels comprises changing a pixel having said first threshold level and an input closest to said first threshold level when said second number of pixels having said first threshold level is greater than 1.

16. The method according to claim 9, wherein the step of determining a first threshold level comprises the step of setting said first threshold level to $-0.5/L$ if said determined first threshold level is determined to be 0.

17. The method according to claim 16, wherein the step of determining a second threshold level comprises the step of setting said second threshold level to $1+0.5/L$ if said determined second threshold level is determined to be 0.

18. The method according to claim 17, wherein the step of reducing said total error comprises reducing said total error until a total of said first changed pixels is equal to said second number of pixels having said second threshold level.

19. The method according to claim 18, wherein the step of increasing comprises increasing said total error until a total of said second changed pixels is equal to said first number of pixels having said first threshold level.

20. The method according to claim 19, wherein the step of first changing pixels comprises changing a pixel having said second threshold level and an input closest to said second threshold level when said first number of pixels having said second threshold level is greater than 1.

21. The method according to claim 20, wherein the step of second changing pixels comprises changing a pixel having said first threshold level and an input closest to said first threshold level when said second number of pixels having said first threshold level is greater than 1.

* * * * *